United States Patent Office 3,490,373
Patented Jan. 20, 1970

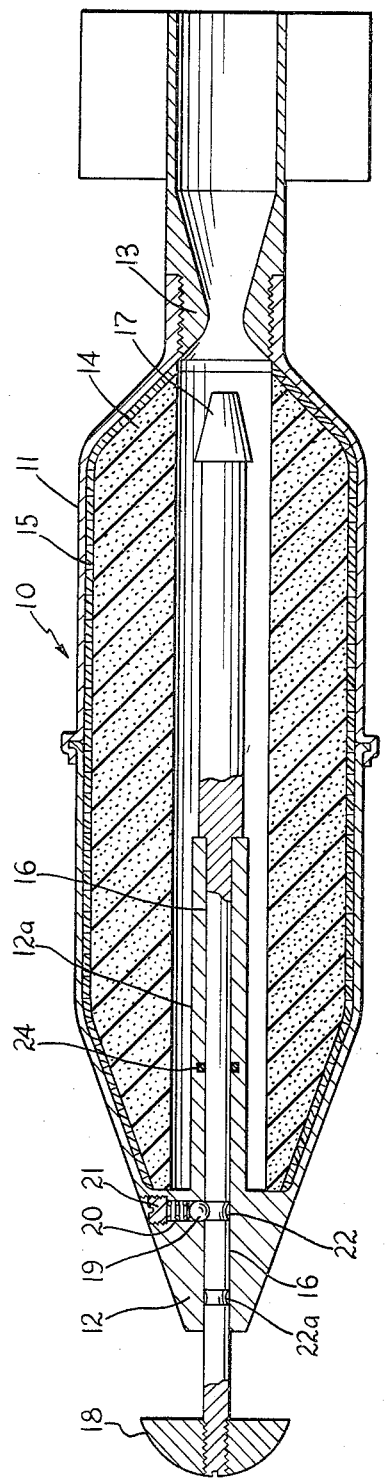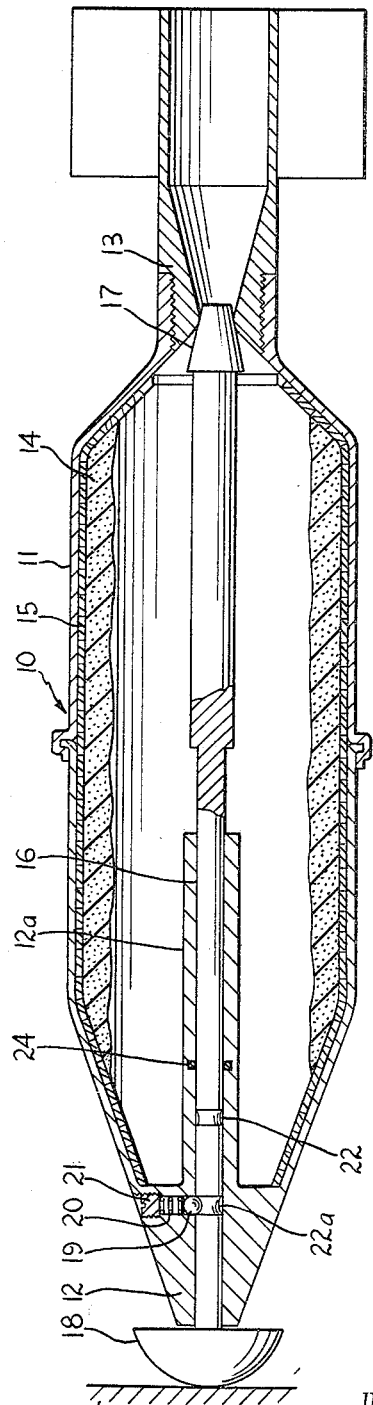

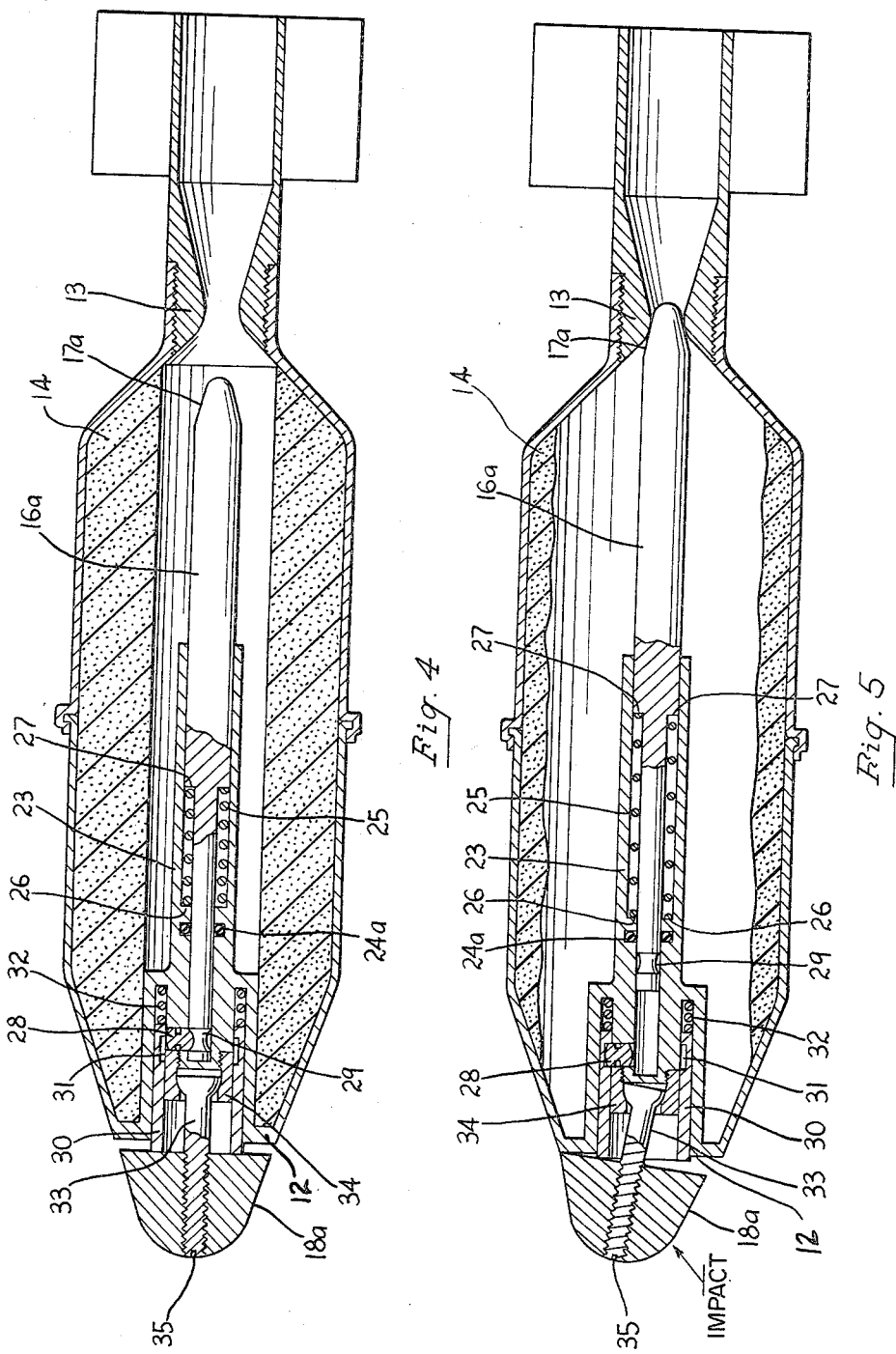

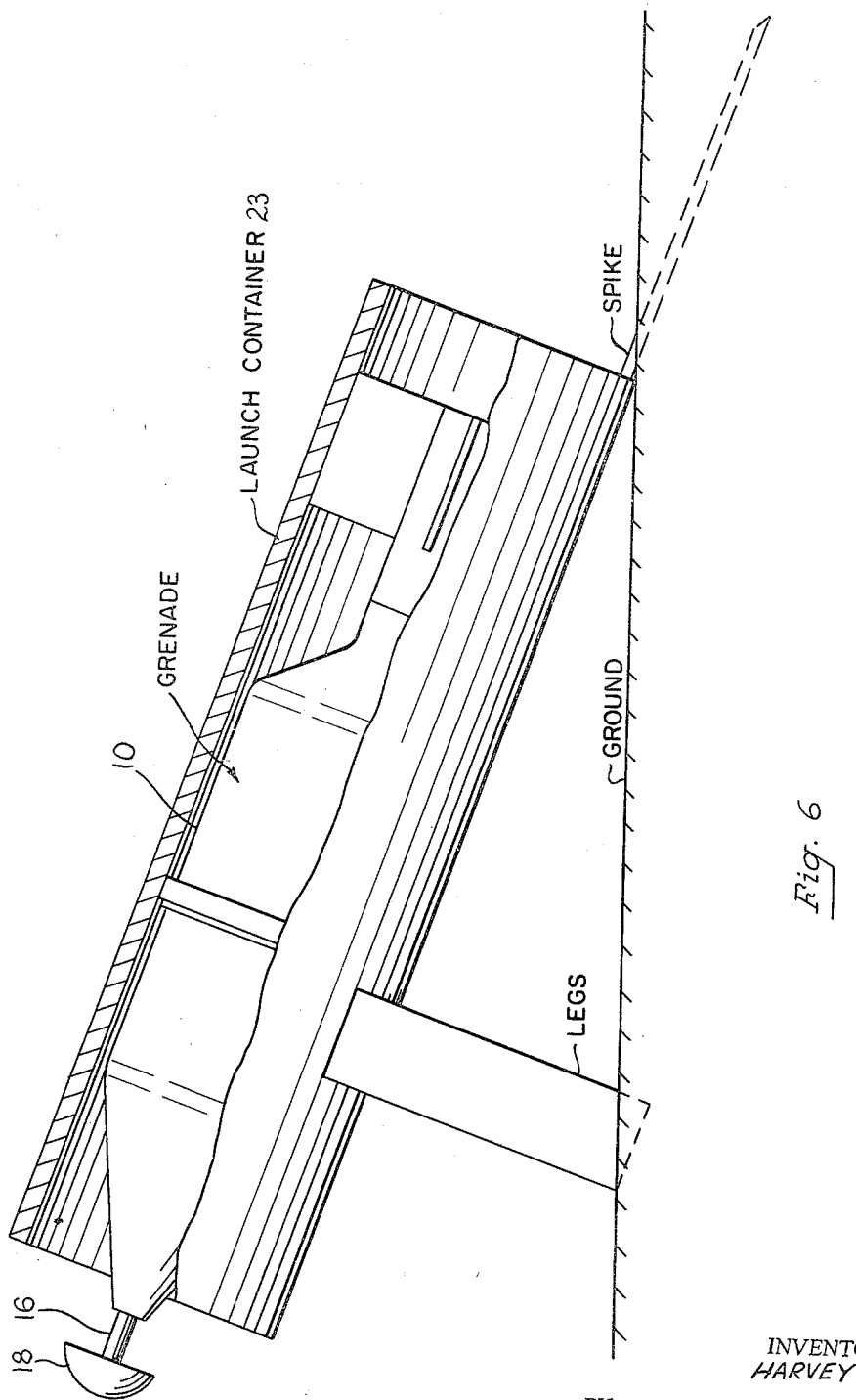

3,490,373
SELF-DESTRUCTING ROCKET
PROPELLED GRENADE
Harvey Fox, Rockaway, N.J., assignor to Thiokol Chemical Corporation, Bristol, Pa., a corporation of Delaware
Filed May 9, 1968, Ser. No. 728,010
Int. Cl. F42b 11/42
U.S. Cl. 102—64    4 Claims

ABSTRACT OF THE DISCLOSURE

A rocket propelled grenade is made to explode upon impact with a target by movement of a plug into the nozzle outlet of the rocket motor to close it thus causing the grenade to burst due to the excessive increase in pressure of the gases created by the continued combustion of the rocket propellant.

---

The present invention relates to a weapon of the grenade type and in particular to a grenade which is both rocket propelled and self-destroyed and utilizes no explosive material other than the rocket propellant itself.

One of the problems associated with explosive projectiles of the rocket propelled variety is that of providing a simple and positive means of initiating the explosion. A variety of fuzes, escapements and other mechanisms have been employed in the past for this purpose but tend to be complex in nature, heavy and not always entirely reliable because of their complexity. The present invention solves this problem by providing a simple and very reliable device which is also light in weight and thus permits of greater range, better logistic qualities and other advantages such as simplicity and economy of manufacture. This is accomplished by explosively destroying the rocket motor itself by the plugging of its outlet nozzle upon impact of the grenade with a target, the gases produced by the combustion of rocket propellant developing pressure in ever increasing amount until explosion occurs. It is to be understood that the grenade is to be used only within its range which is determined by how much propellant is present in it to produce combustion gas pressure. The grenade is ordinarily intended to be impacted and the nozzle outlet closed prior to the exhaustion of the propellants so that gas pressure can increase until the grenade bursts.

It is, therefore, an object of the present invention to provide a rocket propelled grenade which is positive in operation and yet simple, light weight and easily manufactured.

It is also an object to provide a rocket-propelled grenade which when used within its range is self-destroyed upon impact without the necessity for complex fuzing, delay or impact ignition means.

In the drawings:

FIGURE 1 is a side view of the grenade in longitudinal partial section showing the rocket in the launch ready condition;

FIGURE 2 is a side view similar to FIGURE 1 but showing the grenade immediately after it strikes a target but before the explosion;

FIGURE 4 is a longitudinal partially sectional view of the grenade showing an articulated striker and showing the grenade in the launch ready condition;

FIGURE 5 is a view similar to FIGURE 4 showing the grenade after impact but just prior to explosion;

FIGURE 6 is a view of a typical launching means for the rocket propelled grenade with the rocket grenade in place ready to be launched.

Figure 3:
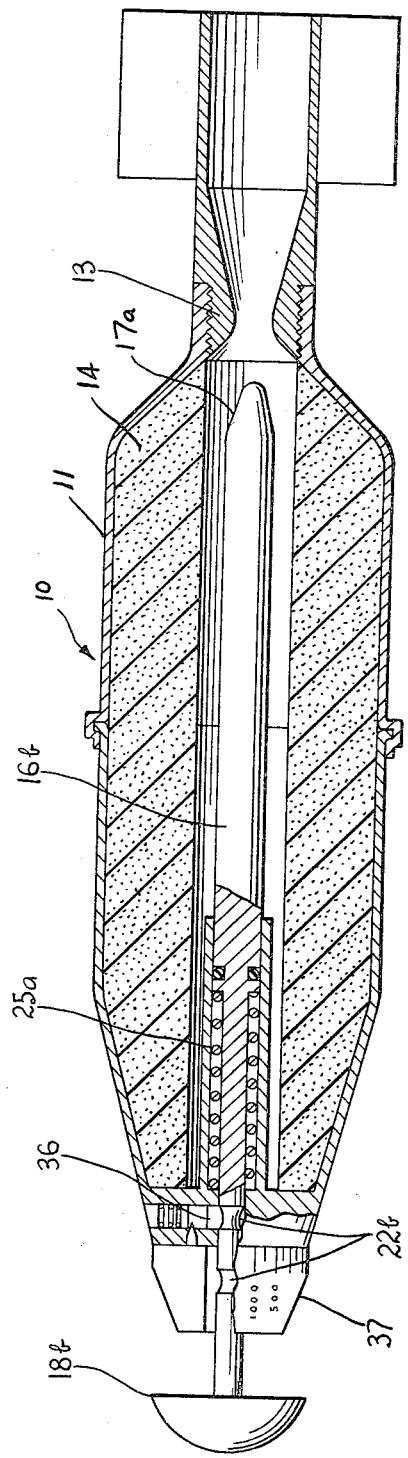
FIGURE 3 is a view similar to FIGURE 2 but including a timer.

In one embodiment of the present invention and with reference to FIGURE 1, a rocket thrust chamber 10 comprises a body or housing 11, a head 12 and a nozzle 13. Included within thrust chamber 10 is a solid propellant 14 in annular form and defining a hollow area about its longitudinal axis as shown leading from the head 12 to nozzle 13. The solid propellant can be of any of the well known types used for rocket motors such as, for instance, an ammonium perchlorate or ammonium nitrate type. Surrounding the solid propellant 14 is a fragmentation coil or winding 15. Disposed within the head 12 and adapted to slide in head 12 and lying substantially along the longitudinal axis of the thrust chamber 10, is rod 16 which has at its right hand end in FIGURE 1 a plug 17 and at its left hand end a striker 18. Plug 17 is in the form of a truncated right cone (as shown) of larger base diameter than the nozzle throat or it could be of a variety of other shapes which would serve to plug the nozzle in a wedging fashion to substantially seal off the flow of combustion gases. Another form of plug is shown as 17a in FIGURE 4.

The rod 16 extends through head 12, O-ring seal 24 and guide tube 12a and is slidable therein, tube 12a serving as a guide to direct plug 17 into the nozzle opening. Rod 16 is sufficiently long in dimension that when plug 17 is in the nozzle opening the striker 18 will not quite touch the head 12. O-ring seal 24 serves to prevent combustion gases from passing out of the combustion chamber between rod 16 and head 12.

In order to prevent inadvertent motion of rod 16 with possible premature explosion of the grenade and to keep rod 16 in the of (nozzle plugged) position upon impact, a detent 19 is provided which keeps rod 16 from moving either to the left or to the right under normal aerodynamic or launching "G" loads but is easily overcome by target impact loads upon striker 18. Detent 19 can be in the form of a ball 19 which is urged into partial recess in concavities 22 and 22a in rod 16 depending upon the position of rod 16 by a spring 20, the spring being held in place by a suitable screw plug 21 or the like.

In operation, the grenade with its nozzle open as shown in FIGURE 1 is intended to be loaded into a suitable launcher such as is indicated in FIGURE 6 and is fired by means of a simple squib or other conventional igniter (not shown). As ignition of the propellant takes place, combustion gases are created in the thrust chamber 10 and start to flow out of the nozzle, the pressure of the gases increasing in the chamber until equilibrium is reached between the quantity of gases generated and the quantity flowing through the outlet of nozzle 13. Meanwhile, as the gases flow from the nozzle, the grenade is propelled toward its target with the propellant generating gases continuously. When the target is impacted by striker 18 at the head of the grenade, the impact overcomes the spring-loaded detent ball 19 and the striker and its attached rod 16 are driven back toward the nozzle end until plug 17 is forced into the throat of nozzle 13 closing it and preventing substantially all flow of gases from the combustion chamber. The combustion, however, continues to produce gases at a very rapid rate resulting in an ever increasing pressure until the body or housing 11 can no longer withstand it and bursts with explosive and destructive force. The fragmentation coil 15 also bursts and is dispersed into many destructive fragments thus enhancing the overall destructive effect of the grenade. After impact the explosion will take place almost immediately due to the rapid rise in pressure and could be considered to be immediate for all practical purposes. It is to be noted that upon impact the detent ball 19 will enter concavity 22a in rod 16 as rod 16 moves toward nozzle 13 and will prevent any tendency of the plug 17 to move away from the outlet of the nozzle if the impact force is removed such as might be the case if the grenade should bounce back or the target be toppled away from it.

In another arrangement of the present invention shown in FIGURES 4 and 5, rod 16a is slidable in guide 23 through O-ring seal 24a and is spring-loaded in the direction of nozzle 13 by compressed spring 25 located between it and guide 23 and pressing against shoulder 26, 27 in the manner shown. Rod 16a is, however, prevented from movement by detent piston 28, the concave lower end of which is adapted to engage concavity 29 in rod 16a, with detent 28 held in that position by annular slide 30 as shown in FIGURE 4. Slide 30 has an internal annular recess 31 of sufficient depth and width to allow detent 28 to recede into it sufficiently to release rod 16a but is prevented from this action by compression spring 32 which urges slide 30 to the left in FIGURE 4 to keep recess 31 out of alignment with the detent piston 28. Slide 30 is kept from further movement to the left in FIGURE 4 by striker 18a but bears against it under the urging of spring 32, striker 18a being itself attached to guide 23 by means of screw 33 and retainer nut 34. As will be seen from FIGURES 4 and 5, screw 33 is formed into a hemispherical surface or half-ball which notes with a matching surface on nut 34 and provides an articulated universal type joint. The foregoing trigger mechanism can be assembled by first fastening screw 33 by threading nut 34 over the half-ball end of screw 33 and then threading striker 18a onto the threaded other end of screw 33 using a screw driver in slot 34 to keep screw 33 from turning.

As can be seen from FIGURES 4 and 5, an impact blow upon striker 18a either or from a partially side or glancing blow direction will cause screw 33 to rotate about its articulated joint and striker 18a will force sleeve 30 inward (to the right in FIGURE 5). This action causes recess 31 to become aligned with detent 28 which is then forced upward into it as concavity 29 pushes it there with a wedging action under the urging of the spring 25 as it acts upon rod 16a. As this occurs, rod 16a is freed and it moves rapidly to the right in FIGURE 5 and plugs nozzle 13 as shown. The grenade then explodes in the same manner and for the same reasons as previously described.

Another arrangement of the present invention utilizing a trigger mechanism and shown in FIGURE 3, again has a rod (designated as 16b similar to that of FIGURES 1 and 2 but which is spring-loaded by compression spring 25a in the manner shown. Rod 16b also has concavities 22b, 22c in it similar to 22, 22a of FIGURE 1 and these serve in the same capacity that they do in the arrangement shown in FIGURES 1 and 2 except that the withdrawal of the detent piston 36 can be to occur at a predetermined time by means of a timing mechanism 37 which moves a conically-shaped detent release pin 38 toward detent piston 36 and forces its withdrawal from concavity 22b, thus freeing spring 25a to urge rod 16b to the right in FIGURE 3 to plug the nozzle and cause explosion of the grenade. If impact occurs prior to lapse of the predetermined time interval, the grenade explodes in the same manner as occurs with the configuration shown in FIGURES 1 and 2, i.e. impact of the striker upon a target drives the rod to the right in FIGURE 3 overcoming the detent and plugging the nozzle outlet.

The timer is useful under conditions where it is important that the grenade explode with precise early timing rather than at impact.

What is claimed is:

1. A rocket propelled grenade comprising, in combination, a rocket thrust chamber having a wall, a head, a thrust nozzle with an outlet, a propellant in the thrust chamber, means for igniting the propellant, a nozzle plug adapted for movement into the nozzle outlet to substantially close it prior to exhaustion of the propellant, means for initiating said movement including a continuous rod extending from the plug through the head and slidable therein, a striker attached to the rod at the exposed end of the rod, detent means co-operating with said rod and restraining it from longitudinal movement except under impact conditions, and said rod being of sufficient length that when the striker impacts a target the rod is forced inwardly and the nozzle is closed by the plug.

2. A rocket propelled grenade comprising, in combination, a rocket thrust chamber having a wall, a head, a thrust nozzle with an outlet, a propellant in the thrust chamber, means for igniting the propellant, a spring-loaded nozzle plug adapted for movement into the nozzle outlet to substantially close it prior to exhaustion of the propellant, and trigger means initiated upon impact with a target adapted to release the plug and thus allow it to be urged into the nozzle outlet.

3. The invention set forth in claim 2 with the trigger means comprising an articulated jointed striker and detent means actuated thereby to release the spring-loaded plug.

4. The invention set forth in claim 3 with the detent means comprising a detent piston set in a concavity associated with a rod attached to the plug and a spring-loaded member slidable with respect to the detent piston but retained by the striker and having a recess adapted to receive the detent piston when the member is depressed by the striker upon impact of the striker upon a target.

References Cited

UNITED STATES PATENTS

| | | | |
|---|---|---|---|
| 2,094,032 | 9/1937 | Zornig | 102—71 |
| 2,470,162 | 5/1949 | Goehmann. | |
| 2,552,497 | 5/1951 | Roach et al. | |
| 2,909,032 | 10/1959 | Davies. | |
| 2,931,301 | 4/1960 | Hjelm et al. | 102—73 |
| 3,059,425 | 10/1962 | McSherry et al. | |
| 2,944,390 | 7/1960 | Keathley et al. | 60—254 |

BENJAMIN A. BORCHELT, Primary Examiner

CHARLES T. JORDAN, Assistant Examiner

U.S. Cl. X.R.

102—73